United States Patent [19]

Alley

[11] 4,384,418

[45] May 24, 1983

[54] ELASTIC ACTION SHELF DISPLAY

[75] Inventor: Richard O. Alley, Bayside, N.Y.

[73] Assignee: Jerry Moss, Inc., New York, N.Y.

[21] Appl. No.: 342,656

[22] Filed: Jan. 25, 1982

[51] Int. Cl.$^3$ .......................... G09F 3/18; G09F 7/22; G09F 19/00; F16M 13/00

[52] U.S. Cl. .......................................... 40/16.4; 40/613; 40/604; 40/124.1; 40/617; 248/609

[58] Field of Search ................ 40/16.4, 613, 602, 603, 40/604, 614, 601, 536, 530, 617, 16.2, 16.6, 584, 40/124.1; 248/609, 329, 330.1, 328, 331

[56] References Cited

U.S. PATENT DOCUMENTS

| | | | |
|---|---|---|---|
| 2,130,945 | 9/1938 | Brownell | 40/617 |
| 3,015,898 | 1/1962 | Keeslar | 40/613 |
| 3,708,899 | 1/1973 | Berry, Jr. | 40/617 |
| 3,742,632 | 7/1973 | Bollbach et al. | 40/617 |
| 3,774,328 | 11/1973 | Tanney | 40/617 |

*Primary Examiner*—Gene Mancene
*Assistant Examiner*—Michael J. Foycik, Jr.
*Attorney, Agent, or Firm*—Marvin Feldman; Stephen E. Feldman; Jules L. Chaboty

[57] ABSTRACT

A shelf display is constructed for vertical elastic mounting of a product information member between upper and lower shelves. The product information member extends outwardly from the edges of the shelves so as to be viewable to a prospective purchaser moving down an aisle parallel to the shelves. The air movement caused by the normal walking of the prospective purchaser causes the sign to vibrate or quiver, and thereby further attracts the prospective purchaser's attention.

8 Claims, 5 Drawing Figures

FIG. 1
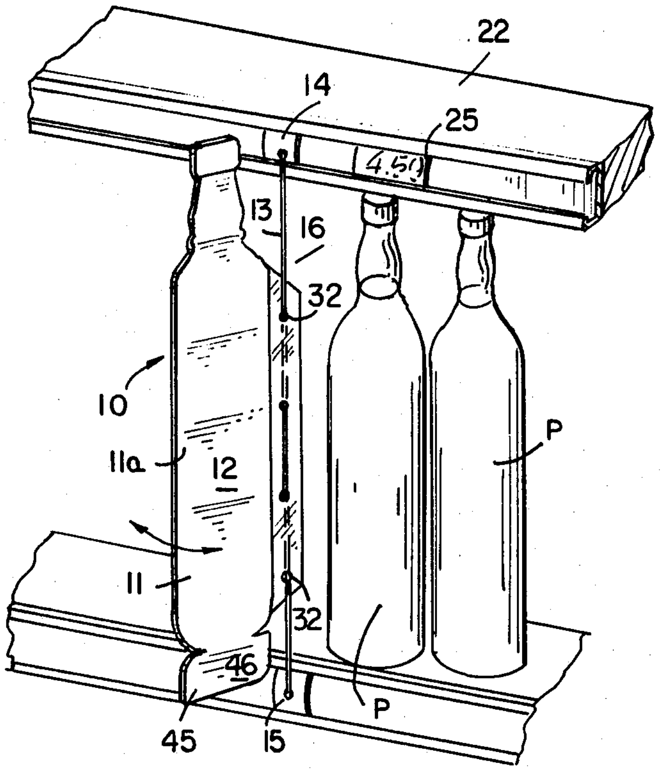
FIG. 3
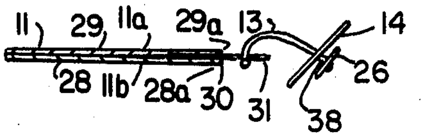
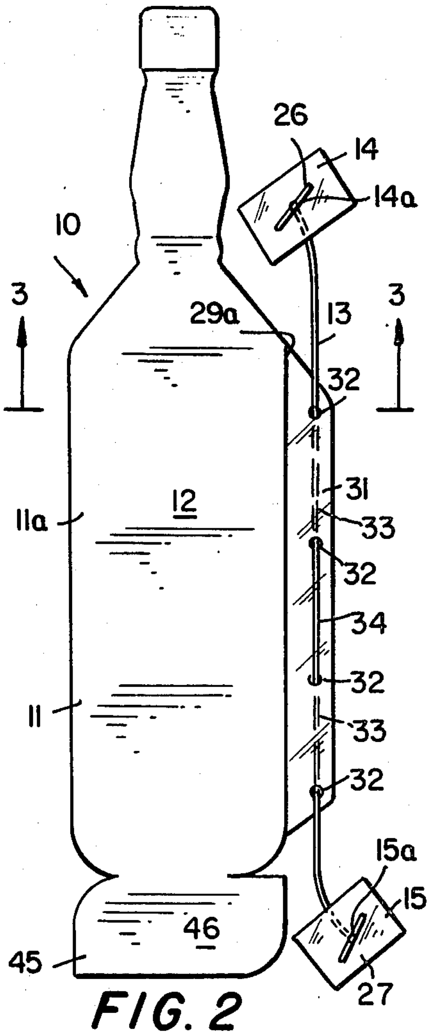
FIG. 2
FIG. 4
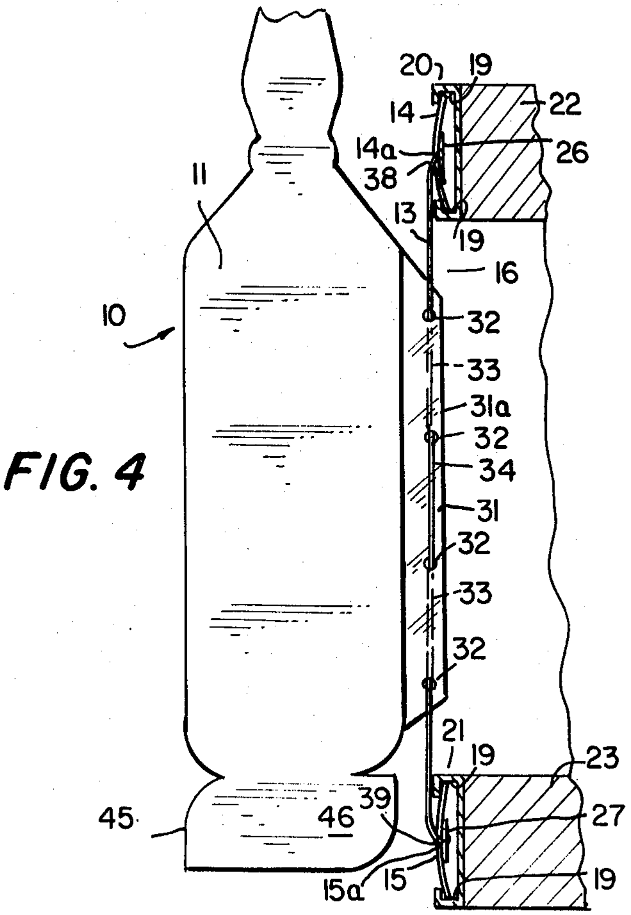
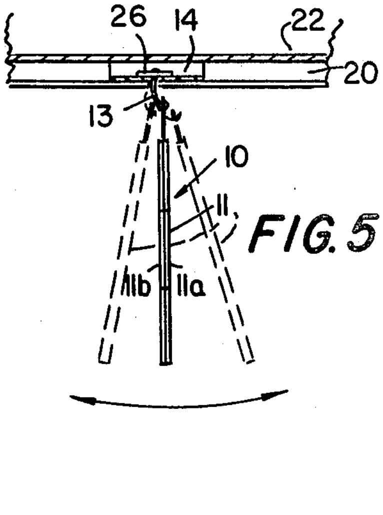
FIG. 5

ELASTIC ACTION SHELF DISPLAY

FIELD OF THE INVENTION

This invention relates to a display. Specifically, this invention relates to a shelf display that moves to attract the prospective purchaser's attention.

BACKGROUND AND DISCUSSION OF THE PRIOR ART

In the merchandising of products on shelves, such as on supermarket or liquor store shelves, it was known to fixedly mount displays adjacent the shelves. Such displays were often difficult to see when viewed from a position parallel to the shelves, and unless the display was of exceptional size, the prospective purchaser was not particularly drawn to the display. Those displays that were in-part movable, were often costly to manufacture and cumbersome to maintain.

It was also known in the prior art to provide outdoor signs which were filament support so as to rotate by a breeze, such as is disclosed in Berger, U.S. Pat. No. 4,068,817, granted Jan. 17, 1978; and Kirkman, U.S. Pat. No. 3,030,718, granted Apr. 24, 1962.

Now there is provided by the present invention, a shelf display which is readily mounted to conventional store shelving, is of modest size, and yet by induced motion is movable so as to attract the prospective purchaser's attention.

It is a principal object of the present invention to provide a novel shelf display which attracts the attention of a prospective purchaser.

It is another object of the present invention to provide a shelf display as aforesaid in which movement by the prospective purchaser induces motion of the display.

It is still a further object of the present invention to provide a shelf display as aforesaid which is readily mounted to conventional shelf pricing area edges.

It is another object of the present invention to provide a shelf display which is readily manufactured of relatively inexpensive materials, is practical in design and construction, and yet safe and practical in use.

The aforesaid, as well as other objects and advantages will become apparent from a reading of the following descriptions, the adjoined claims, and the accompanying drawings, in which:

BRIEF DESCRIPTION OF THE DRAWINGS

FIG. 1 is a perspective view of the shelf display as mounted to the shelves in actual use;

FIG. 2 is a front elevational view of the shelf display prior to actual use;

FIG. 3 is a sectional view taken along line 3—3 of FIG. 2;

FIG. 4 is a side elevational view of the shelf display as shown in FIG. 1; and

FIG. 5 is a partial top plan view of the shelf display of FIG. 1.

SUMMARY OF THE INVENTION

A shelf display is constructed by the elastic mounting of an advertising display member between and to the edges of upper and lower shelves, so that the display member extends into the aisle adjacent to the shelves, and with movement of the air there is concommitant back-and-forth movement or vibration of the display member, thereby attracting the attention of a prospective purchaser.

DESCRIPTION OF THE PREFERRED EMBODIMENTS

Referring to the FIGURES, there is shown the elastic action shelf display of the present invention, generally referred to as 10. Display 10 in a broad sense is constructed of a cardboard and plastic display member or board 11 with advertising product information 12 imprinted on both sides 11*a* and 11*b*, elastic support strand 13 to which member 11 is attached, and a pair of upper and lower mounting plates or cards, 14 and 15, respectively. Elastic support string or strand 13 is threaded through holes 14*a* and 15*a* and held with metal stops or pins 26 and 27 on cards 14 and 15, respectively, for supporting the strand 13 in a vertical disposition, as shown at 16. Cards 14 and 15 are formed of transparent plastic sheeting so as to be readily, flexibly force-fitted into card slots 19 of shelving edges 20 and 21, of upper and lower shelves 22 and 23, respectively. The transparent character of the cards permits viewing of pricing information which may be on conventional information cards 25 adjacent to or inadvertently lodged underneath the cards 14 and 15.

Member 11 is formed of two back-to-back cardboard sheets 28 and 29 which are cut to generally approximate the appearance of the product P disposed on shelf 23. Sheet 28 provides surface 11*a* and sheet 29 provides surface 11*b*, which surfaces bear the appearance and product information of product P. The sheets 28 and 29 are adhesively secured in a back-to-back manner with transparent plastic sheet 30 adhesively wedge between sheets 28 and 29; as best shown in FIG. 3. A portion 31 of sheet 30 extends away from edges 28*a* and 29*a* of sheets 28 and 29 respectively. A series of four vertically arranged holes 32 are formed in portion 31, which holes are sized to slidably receive elastic support string 13. The string is threaded in-and-out, as at 33 and 34, of holes 32, so as to provide an attachment between member 11 and string 13, and to insure a vertical disposition of the member 11. Edge 31*a* is vertically disposed between shelf edges 20 and 21. It is important to note that holes 32 are disposed at an angle to edge 31*a* so that the top hole 32 is closer to edge 31*a* than the bottom hole 32 to insure proper balance of member 11.

Ends 38 and 39 of string 13 pass through holes 14*a* and 15*a* respectively and are then secured to metal retaining stops or pins 26 and 27, respectively. The cards 14 and 15 and then inserted in slots 19 of shelf edges 20 and 21 and the string is stretched and maintained in tension with the cards in the slots. In this manner of construction, member 11 is vertically disposed at right angles with regards to the shelves 22 and 23, so that the information 12 on faces 11*a* and 11*b* is viewable from a position parallel to the shelves; that is, from the direction of prospective customer would in walking down an aisle, approach the shelf. With the movement of the customer in the proximity of member 11, member 11 vibrates back-and-forth (as shown by the double-headed arrows in FIGS. 1 and 5), thereby attracting the purchaser's attention.

It is to be borne in mind that member 11 is shaped generally in the configuration of the product P (FIG. 1), but may assume additional or other shapes as well. It is also noted that an advertising flap 45 may also be added to or integrally extended from as a part of member 11, which flap 45 may contain additional information 46 relative to the product or specific sale information related to the product P.

It is to be noted that while the display member is shown of cardboard and plastic sheet composite construction, other light-weight durable materials may also be employed both as an individual sheet, as well as in composite construction, including thermoplastic sheeting, plastic impregnated cellulosic sheeting, and other like stiff sheeting.

The shelf display of the present invention is particularly suited for use on shelving in supermarkets, liquor stores, drug stores and the like. This is particularly so where the displays are disposed in conventional aisles, so that when the user passes by, there is substantial air movement with concommitant display member vibrations.

As various other modifications may be made to the present invention as will be known to those skilled in the art, the present invention is not to be construed as being limited to the specific details as hereinbefore shown and discussed but shall be construed by the appended claims.

What is claimed is:

1. A shelf display comprising; a display member; support means for supporting said display member, said support means comprising an elastic member so as to permit movement of said display member; means for mounting said support means disposed at opposite ends of the support means; means for attaching said display member to said support means, so that said display member is vertically disposed between upper and lower shelves having product information card slots; and said means for mounting said support means comprising a pair of vertically spaced cards being sized to fit the product information card slots, whereby the slot fitted cards place the elastic member under tension with said display member vertically disposed between the shelves.

2. The shelf display of claim 1, said display member being a sheet sized to appear as a product and having the product appearance information thereon.

3. The shelf display of claim 1, said elastic members comprising an elastic string, and said cards being formed with means for holding the string to the cards.

4. The shelf display of claim 1, said member being a board, and wherein said board is formed so as to vibrate by the motion of air caused by a prospective purchaser in passing the display board.

5. The shelf display of claim 4, said means for attaching said display member and said display member being formed so that said member is disposed substantially outwardly from the display shelves, so as to be viewed parallel to the shelves.

6. The shelf display of claim 1, said cards being transparent so as to permit display of product information disposed in the slots.

7. The shelf display of claim 2, said sheet containing product information on opposite sides, with said information being viewable from opposite ends of an aisle.

8. The shelf display of claim 1, said means for attaching said display member comprising a flange formed on said display member, said flange being formed with means for receiving said elastic member.

* * * * *